(No Model.)
W. E. McCALL.
STUMP EXTRACTOR.
No. 495,161. Patented Apr. 11, 1893.
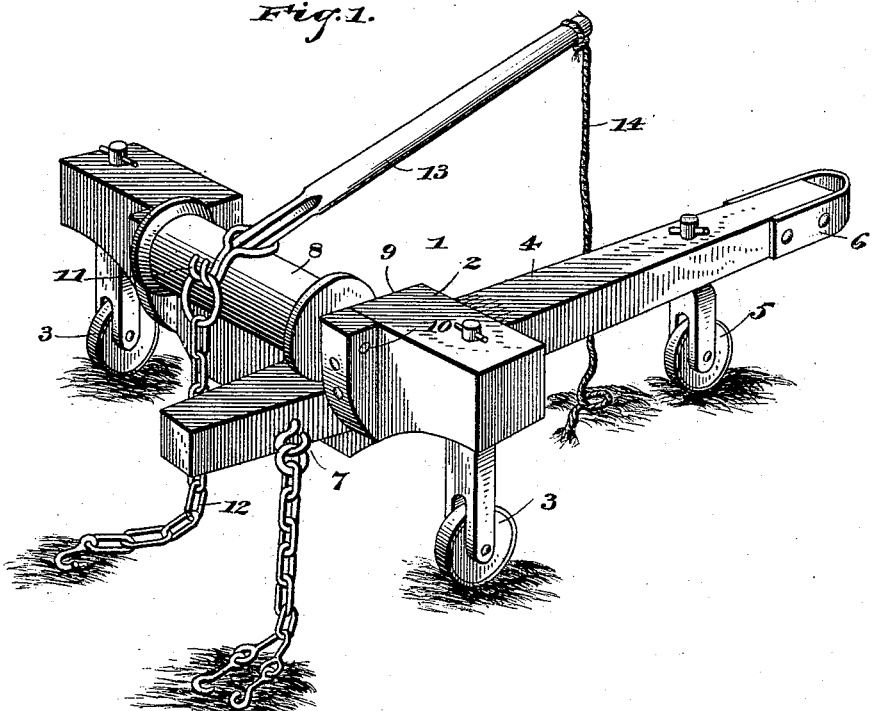
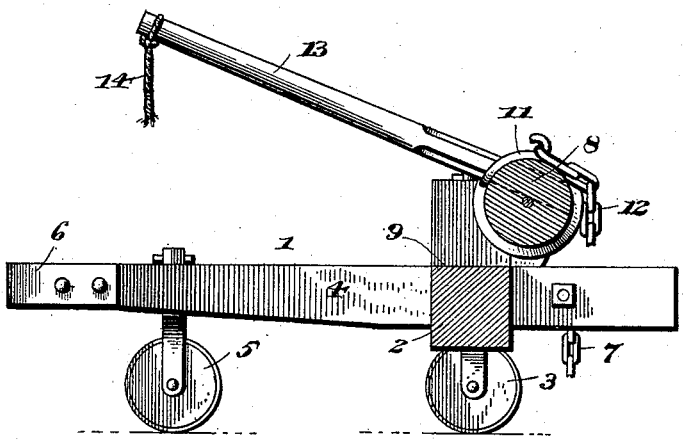
Witnesses
Inventor
Wiley E. McCall,
By his Attorneys,

UNITED STATES PATENT OFFICE.

WILEY E. McCALL, OF JASPER, FLORIDA, ASSIGNOR OF ONE-HALF TO PENNYWELL F. McCALL, OF SAME PLACE.

STUMP-EXTRACTOR.

SPECIFICATION forming part of Letters Patent No. 495,161, dated April 11, 1893.

Application filed January 31, 1893. Serial No. 460,300. (No model.)

*To all whom it may concern:*

Be it known that I, WILEY E. MCCALL, a citizen of the United States, residing at Jasper, in the county of Hamilton and State of Florida, have invented a new and useful Stump-Extractor, of which the following is a specification.

The invention relates to improvements in stump extractors.

The objects of the present invention are to improve the construction of stump extractors, and to provide a simple and effective one capable of enabling stumps of trees to be readily and easily removed from the ground.

The invention consists in the construction and novel combination and arrangement of parts hereinafter fully described, illustrated in the accompanying drawings and pointed out in the claims hereto appended.

In the drawings—Figure 1 is a perspective view of a stump extractor constructed in accordance with this invention. Fig. 2 is a longitudinal sectional view.

Like numerals of reference indicate corresponding parts in both the figures of the drawings.

1 designates a frame comprising a cross-piece 2 provided at each end with a caster wheel 3, and a longitudinally disposed beam 4 secured to the cross-piece a little to one side of the center thereof and extending rearward from the same a short distance. The beam 4 is provided near its front end with a caster wheel 5 and at its front end with a clevis 6 to enable horses or other draft animals to be readily connected to the beam. The rearwardly extended portion of the beam is provided, adjacent to the cross bar 2, with a chain having a grapple 7 adapted to be secured to a stump; and when the machine or extractor is turned to twist the stump to loosen the latter in the ground. The stump is lifted out of the ground by a chain 12, attached to a windlass 8 arranged opposite a central opening 9 of the cross-piece and journaled in suitable bearings 10 at the rear side of the cross-piece. The windlass is provided with a hook 11 and a chain 12 and is adapted to be turned or partially rotated to wind up the chain by a lever or handle 13 to the outer end of which is secured a rope 14 by means of which suitable power may be applied to the lever or handle. When a stump has been loosened by twisting in the ground the chain 12 is passed around it and the free end is fastened to the hook 11, and the lever or handle 13 is moved or swung forward to wind up the chain, whereby the stump is lifted out of the ground. The caster wheels which have stems journaled in vertical openings of the frame enable the latter to turn freely in twisting a stump.

It will be seen that the stump extractor is simple and inexpensive in construction and effective in operation, and that it will enable stumps to be quickly removed from the ground.

Changes in the form, proportion and the minor details of construction may be resorted to without departing from the principle or sacrificing any of the advantages of this invention.

What I claim is—

1. A stump extractor, comprising a frame having a beam, caster wheels supporting the frame and arranged at each side thereof and near the front end of the beam, a grapple arranged at the rear of the frame and adapted to be connected to a stump to enable the latter to be twisted, and a windlass mounted on the frame for lifting the stump, substantially as described.

2. A stump extractor, comprising a frame, a cross-piece having a central opening, and a beam secured to the cross-piece and extended in rear of the same, caster wheels supporting the frame and arranged at the ends of the cross-piece and near the forward end of the beam, a grapple attached to the extended portion of the beam, and a windlass journaled at the opening of the cross-piece and provided with a handle and having a chain, substantially as described.

In testimony that I claim the foregoing as my own I have hereto affixed my signature in the presence of two witnesses.

WILEY E. McCALL.

Witnesses:
B. SMALL,
T. S. DUNCAN.